No. 681,578. Patented Aug. 27, 1901.
J. A. REEVES.
FERTILIZER DISTRIBUTER ATTACHMENT FOR PLOWS.
(Application filed Jan. 22, 1901.)
(No Model.) 2 Sheets—Sheet 1.
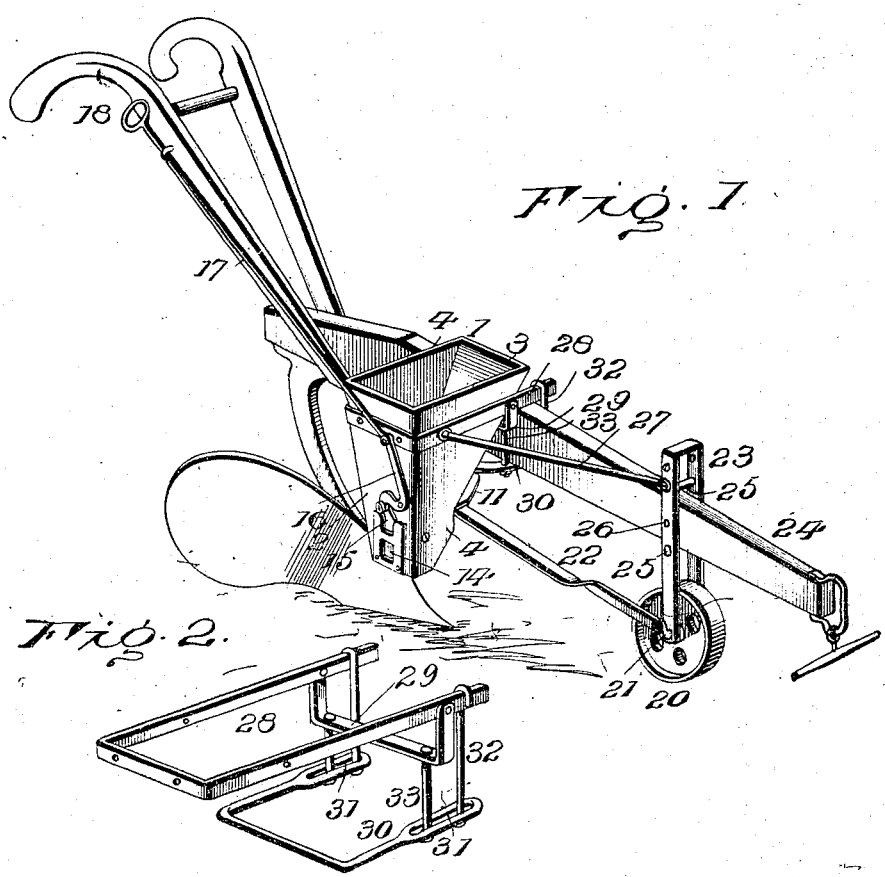
Inventor
J. A. Reeves
Witnesses

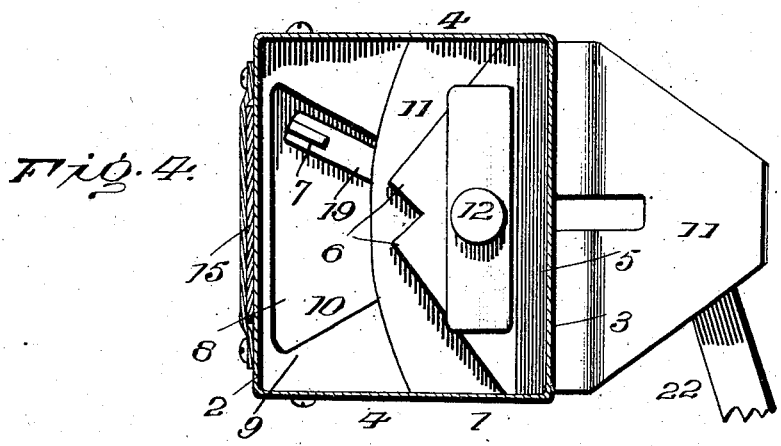

UNITED STATES PATENT OFFICE.

JOHN A. REEVES, OF GOLDSBORO, NORTH CAROLINA.

FERTILIZER-DISTRIBUTER ATTACHMENT FOR PLOWS.

SPECIFICATION forming part of Letters Patent No. 681,578, dated August 27, 1901.

Application filed January 22, 1901. Serial No. 44,281. (No model.)

*To all whom it may concern:*

Be it known that I, JOHN A. REEVES, a citizen of the United States, residing at Goldsboro, in the county of Wayne and State of North Carolina, have invented certain new and useful Improvements in Fertilizer-Distributer Attachments for Plows; and I do hereby declare the following to be a full, clear, and exact description of the invention, such as will enable others skilled in the art to which at appertains to make and use the same.

This invention aims to provide a fertilizer-distributer of novel construction for ready attachment to the beam of any kind of plow or cultivator, and which will admit of the distribution of the fertilizer being under control of the operator at all times.

The attachment can be used for planting various kinds of seed, and is so constructed as to assure a delivery of the fertilizer or grain and to prevent choking thereof in the hopper.

For a full description of the invention and the merits thereof and also to acquire a knowledge of the details of construction of the means for effecting the result, reference is to be had to the following description and drawings hereto attached.

While the essential and characteristic features of the invention are necessarily susceptible of modification, still the preferred embodiment of the invention is illustrated in the accompanying drawings, in which—

Figure 1 is a perspective view of a plow, showing the attachment in position. Fig. 2 is a perspective view of the instrumentalities for adjustably connecting the hopper to the beam of the plow or cultivator. Fig. 3 is a transverse section of the hopper and beam. Fig. 4 is a horizontal section of the hopper above the cut-off. Fig. 5 is a horizontal section of the hopper just below its bottom. Fig. 6 is a detail perspective view of the lower portion of the hopper.

Corresponding and like parts are referred to in the following description and indicated in all the views of the drawings by the same reference characters.

The attachment is intended for application and use in connection with a plow or cultivator of any pattern or make and for distributing fertilizer or planting seed, as may be required. While the appliance is designed most especially for distributing fertilizers simultaneously with the act of cultivation, it is not the intention to restrict its use in this particular or for fertilizing any special plant. The plow or cultivator illustrated is of common construction and has been selected to demonstrate the workings and manner of securing the attachment to this class of implements.

The attachment comprises a hopper 1 and adjunctive parts for insuring a positive feed of the fertilizer in desired quantity. The outer side 2 is vertical, and the inner side 3 slants and inclines outwardly toward the side 2 at its lower end, and the front and rear sides 4 are parallel. The hopper may be constructed of any material best adapted for the purpose; but sheet metal is preferred, since it can be bent into the required shape and avoid the formation of a number of joints. The lower end portion of the inclined side 3 of the hopper is bent inward, as shown at 5, and terminates in points 6, which prevent movement of the fertilizer with the agitator 7 when the appliance is in active operation. The sides 2 and 4 project below the bent end 5 and the space inclosed thereby is covered in the rear by a plate 8, which has its edge portions flanged and fitted close against the lower edges of the extensions of the sides 2 and 4. A second plate 9 is horizontally disposed adjacent to the bent end 5 and its edge portions are flanged and secured in any substantial manner to the lower extensions of the sides 2 and 4. This horizontal plate 9 constitutes a bottom for the hopper and is formed with an opening 10 for the escape of the fertilizer or other article to be delivered. A cut-off 11 operates to regulate the size of the opening 10, so as to control the amount of fertilizer to be distributed in a given time, and, as shown, this cut-off is located between the bent end 5 and the bottom 9 and is held in an adjusted position by means of a bolt or fastening 12, which passes through vertical openings formed in the bent end 5 and the upper portion of the plate 8. A compartment 13 is formed below the bottom 9 by means of the rear plate 8 and the lower extensions of the sides 2 and 4 and receives the fertilizer from the hopper. An opening 14 is formed in the lower portion of the side 2 or front wall of the lower compartment 13 for the escape of the fertilizer, and this opening is controlled by a slide 15, attached to the short arm of an elbow-lever 16, fulcrumed to the outer side 2 of the hopper and under control of the operator by means of a rod 17, which extends within convenient reach of a grip of one of the handles 18 of the plow or cultivator. By operating the rod 17 the slide 15 can be moved so as to close the opening 14 or uncover the same to a greater or less extent as may be required. This slide provides another means for controlling the delivery of the fertilizer.

The agitator 7 has reciprocating or oscillatory movement imparted thereto, which is essential to prevent choking of the fertilizer and banking thereof in the hopper. This agitator projects vertically into the hopper, and consists of an arm at one end of a bar 19, fulcrumed intermediate of its ends upon the bolt or fastening 12 and adapted to be vibrated from the ground-wheel 20 by means of a crank 21 and pitman 22. The crank 21 is formed with or applied to one end of the axle, to which the ground-wheel 20 is secured. As the plow or cultivator is propelled over the ground the wheel 20 is caused to rotate and the agitator vibrated by means of its connection with the wheel in the manner stated, thereby insuring a positive distribution of the fertilizer or article to be delivered.

A frame 23 has adjustable connection with the beam 24 and is of approximately U form, being constructed of a bar of metal having its end portions bent in the same direction, so as to receive between them the beam 24, against the sides of which its vertical members are clamped by upper and lower bolts 25. These bolts 25 pass through selected openings of a series 26, formed in the vertical members of the frame 23 in transverse alinement, thereby admitting of the vertical adjustment of the frame 33, so as to elevate or lower the ground-wheel 20, according to the style of implement to which the attachment is applied or according as it may be desired to raise or lower the front end of the beam 24. It is evident that the frame 23 is also adjustable with the beam 24 to accommodate the hopper and admit of its attachment to the beam 24 in any desired position. A brace 27 extends from the frame 23 to the hopper and its front end is mounted upon one of the bolts 25.

The instrumentalities for securing the hopper to the beam 24 embrace a horizontal frame 28 of substantially U form and embracing the side 2 and the front and rear sides 4, to which it is bolted or firmly attached in any selected way, the inner or free-end portions of the members of the frame being adapted to overlap the top side of the beam 24. A hanger 29 of U form is pendent from the side members of the frame 28 and is designed to come between the hopper and a side of the beam 24. A brace or stay-frame 30 is horizontally arranged and is adapted to come beneath the lower edge of the beam 24 and forms a support for the hopper and prevents inward movement thereof at its lower end. This brace or stay-frame 30 is of U form, and its parallel members are slotted, as shown at 31, to receive the clamp-bolts 32 and 33, by means of which the beam 24 is clamped between the frame 30 and the inner ends of the frame 28. The bolts 33 have their upper ends attached to the horizontal portion of the hanger 29, and the bolts 32 have their upper ends of hook shape and engaged over the inner ends of the side members of the frame 28. This construction admits of the hopper being adjusted laterally and secured to a beam 24 of any vertical and transverse extent.

Having thus described the invention, what is claimed as new is—

1. An attachment for plows and cultivators of the character described, comprising a hopper having its inner side slanting outwardly at its lower end and having the lower end portion of the slanting side inwardly bent, a bottom secured at one end to the bent terminal of the slanting side and formed with a discharge-opening, a compartment below said bottom and having a discharge-opening in its outer side and having its rear wall inclined outwardly and downwardly, a cut-off between the bottom and bent end of the slanting side, and a fastening for connecting said bent end of the slanting side, the adjacent end of the bottom and the cut-off when moved to an adjusted position, substantially as set forth.

2. In an attachment for plows and cultivators of the character described, a hopper having a slanting side terminating in an inwardly-bent end provided with points and having a discharge-opening in its bottom, and an agitator operating through the discharge-opening of the bottom to loosen the fertilizer or article to be distributed, substantially as set forth.

3. In combination, a hopper having the lower end portion of a side inwardly bent to overlap the bottom, which latter is provided with a discharge-opening, a cut-off, a bolt passing through the bent end of a side of the hopper and serving to secure the cut-off in an adjusted position, and an agitator mounted upon the said bolt, and means for imparting a vibratory movement to the agitator, substantially as set forth.

4. In an attachment of the character described for a cultivating-plow, a hopper having a slanting side terminating at its lower end in an inwardly-bent portion and having the three remaining sides extended to form a compartment below the bottom of the hopper, the front wall of said lower compartment having a discharge-opening, a plate attached to the lower edges of the extensions of the sides of the hopper, a bolt or kindred fastening connecting the inwardly-bent end of the slanting side of the hopper with the adjacent end of the plate closing the inner side of the lower compartment, and a cut-off for controlling the discharge-opening in the bottom of the hopper and held in the desired position by the said bolt or fastening, substantially as set forth.

In testimony whereof I affix my signature in presence of two witnesses.

JOHN A. REEVES. [L. S.]

Witnesses:
H. G. GRADY,
CORNELIUS DUNBAR.